' United States Patent (10) Patent No.: US 12,388,078 B2
Park et al. (45) Date of Patent: *Aug. 12, 2025

(54) ANODE ACTIVE MATERIAL FOR LITHIUM SECONDARY BATTERY AND LITHIUM SECONDARY BATTERY INCLUDING THE SAME

(71) Applicant: SK ON CO., LTD., Seoul (KR)

(72) Inventors: Gwi Ok Park, Daejeon (KR); Seok Keun Yoo, Daejeon (KR); Dong Il Jang, Daejeon (KR); Ju Ho Chung, Daejeon (KR)

(73) Assignee: SK ON CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/610,290

(22) Filed: Mar. 20, 2024

(65) Prior Publication Data

US 2024/0222608 A1  Jul. 4, 2024

Related U.S. Application Data

(63) Continuation of application No. 17/856,447, filed on Jul. 1, 2022, now Pat. No. 11,967,705.

(30) Foreign Application Priority Data

Oct. 8, 2021  (KR) .................. 10-2021-0133929

(51) Int. Cl.
  *H01M 4/36*  (2006.01)
  *H01M 4/02*  (2006.01)
  *H01M 4/04*  (2006.01)
  *H01M 4/38*  (2006.01)
  *H01M 4/587*  (2010.01)
  *H01M 10/0525*  (2010.01)

(52) U.S. Cl.
  CPC ......... *H01M 4/366* (2013.01); *H01M 4/0471* (2013.01); *H01M 4/386* (2013.01); *H01M 4/587* (2013.01); *H01M 10/0525* (2013.01); *H01M 2004/021* (2013.01); *H01M 2004/027* (2013.01)

(58) Field of Classification Search
  None
  See application file for complete search history.

(56) References Cited

FOREIGN PATENT DOCUMENTS

KR  20200100557 A  *  8/2020
KR  20200105402 A  *  9/2020

* cited by examiner

*Primary Examiner* — Zhongqing Wei

(74) *Attorney, Agent, or Firm* — IP & T GROUP LLP

(57) ABSTRACT

An anode active material for a lithium secondary battery includes a carbon-based particle including pores therein, a silicon-containing coating layer formed at an inside the pores of the carbon-based particle or on a surface of the carbon-based particle, and a carbon coating layer formed on the silicon-containing coating layer. A full width at half maximum (FWHM) of an O1s peak of a surface measured by an X-ray photoelectron spectroscopy (XPS) is 2.0 or more. A lithium secondary battery including the anode active material having improved initial discharge capacity and capacity efficiency is provided.

13 Claims, 1 Drawing Sheet

ANODE ACTIVE MATERIAL FOR LITHIUM SECONDARY BATTERY AND LITHIUM SECONDARY BATTERY INCLUDING THE SAME

CROSS-REFERENCE TO RELATED APPLICATION AND CLAIM OF PRIORITY

This application is a continuation of U.S. patent application Ser. No. 17/856,447 filed on Jul. 1, 2022, which claims priority to Korean Patent Application No. 10-2021-0133929 filed on Oct. 8, 2021 in the Korean Intellectual Property Office (KIPO), the entire disclosure of which is incorporated by reference herein.

BACKGROUND

1. Field

The present invention relates to an anode active material for a lithium secondary battery and a lithium secondary battery including the same.

2. Description of the Related Art

A secondary battery which can be charged and discharged repeatedly has been widely employed as a power source of a mobile electronic device such as a camcorder, a mobile phone, a laptop computer, etc., according to developments of information and display technologies. Recently, a battery pack including the secondary battery is being developed and applied as a power source of an eco-friendly vehicle such as an electric vehicle.

The secondary battery includes, e.g., a lithium secondary battery, a nickel-cadmium battery, a nickel-hydrogen battery, etc. The lithium secondary battery is highlighted due to high operational voltage and energy density per unit weight, a high charging rate, a compact dimension, etc.

For example, the lithium secondary battery may include an electrode assembly including a cathode, an anode and a separation layer (separator), and an electrolyte immersing the electrode assembly. The lithium secondary battery may further include an outer case having, e.g., a pouch shape.

Recently, as an application range of the lithium secondary battery becomes expanded, a lithium secondary battery having higher capacity and power is being developed. For example, a composite material of silicon and carbon may be used as an anode active material to increase capacity.

However, a difference in volume expansion ratios may become greater in the silicon-carbon composite anode active material to cause cracks in the anode active material and exposure to an electrolyte.

Accordingly, an anode active material capable of suppressing cracks of the anode active material while maintaining capacity properties. For example, Korean Registered Patent Publication No. 10-1591698 discloses an anode active material containing silicon oxide which may not sufficient life-span and power properties.

SUMMARY

According to an aspect of the present invention, there is provided an anode active material having improved power properties and capacity efficiency.

According to an aspect of the present invention, there is provided a lithium secondary battery including an anode active material having improved power properties and capacity efficiency.

An anode active material for a lithium secondary battery includes a carbon-based particle including pores therein, a silicon-containing coating layer formed at an inside the pores of the carbon-based particle or on a surface of the carbon-based particle, and a carbon coating layer formed on the silicon-containing coating layer, A full width at half maximum (FWHM) of an O1s peak of a surface measured by an X-ray photoelectron spectroscopy (XPS) is 2.0 or more.

In some embodiments, an XPS Si2p peak area ratio defined by Equation 3 may be 15.0% or less $$\text{XPS Si2}p \text{ peak area ratio (\%)} = \{p1/(p1+p2+p3)\}*100 \quad \text{[Equation 3]}$$

In Equation 3, p1 is a peak area of a Si—O bond of $SiO_2$ measured on the surface of the anode active material from the XPS, p2 is a peak area of a Si—O bond of SiOx (0<x<2) measured on the surface of the anode active material from the XPS, and p3 is a peak area of a Si—Si bond measured on the surface of the anode active material from the XPS.

In some embodiments, the carbon-based particle includes activated carbon, a carbon nanotube, a carbon nanowire, graphene, a carbon fiber, carbon black, graphite, a porous carbon, a thermally decomposed cryogel, a thermally decomposed xerogel, a thermally decomposed aerogel, etc. These may be used along or in a combination thereof.

In some embodiments, the carbon-based particle may have an amorphous structure.

In some embodiments, silicon included in the silicon-containing coating layer may have an amorphous structure or a crystallite size measured through an X-ray diffraction (XRD) analysis of 7 nm or less.

In some embodiments, the crystallite size of silicon included in the silicon-containing coating layer may be measured by Equation 1.

$$L = \frac{0.9\lambda}{\beta\cos\theta} \quad \text{[Equation 1]}$$

In Equation 1, L is the crystallite size (nm), λ is an X-ray wavelength (nm), β is a full width at half maximum (rad) of a (111) plane of silicon included in the silicon-containing coating layer, and θ is a diffraction angle (rad).

In some embodiments, silicon included in the silicon-containing coating layer may have a peak intensity ratio of 1.2 or less in a Raman spectrum defined by Equation 2 below $$\text{Peak intensity ratio of Raman spectrum} = I(515)/I(480) \quad \text{[Equation 2]}$$

In Equation 2, I(515) is a peak intensity of silicon included in the silicon-containing coating layer in a region having a wavenumber of 515 $cm^{-1}$ in the Raman spectrum, and I(480) is a peak intensity of silicon included in the silicon-containing coating layer in a region having a wavenumber of 480 $cm^{-1}$ in the Raman spectrum.

In some embodiments, the silicon-containing coating layer may further contain at least one of SiOx (0<x<2) and silicon carbide (SiC).

In some embodiments, the carbon coating layer may include carbon or a conductive polymer.

In some embodiments, the carbon coating layer may also be formed on a portion where the silicon-containing coating layer is not formed among the inside of the pores and the surface of the carbon-based particle.

In some embodiments, the FWHM of the O1s peak of the surface measured by the XPS may be 2.4 or more.

A lithium secondary battery includes an anode including the anode active material layer for a lithium secondary battery according to embodiments as described above, and a cathode facing the anode.

In a method of preparing an anode active material for a lithium secondary battery, a first calcination of a carbon-based particle including pores and a silicon source is performed to form a silicon-containing coating layer at an inside of the carbon-based particle or on a surface of the carbon-based particle. A carbon source is introduced to the carbon-based particle on which the silicon-containing coating layer is formed to form a carbon coating layer. A full width at half maximum (FWHM) of an O1s peak from a surface of a particle on which the carbon coating layer is formed measured by an X-ray photoelectron spectroscopy (XPS) is 2.0 or more.

In some embodiments, the carbon source includes pitch, glucose, sucrose, a phenol-based hydrocarbon, a resorcinol-based hydrocarbon, a methane gas, an ethylene gas, a propylene gas, an acetylene gas, polyacetylene, polyaniline, polypyrrole, polythiophene, etc. These may be used alone or in a combination thereof.

In some embodiments, the forming the carbon coating layer further includes a second calcination performed at a temperature less than 600° C.

In some embodiments, the first calcination may be performed at a temperature less than 600° C.

According to exemplary embodiments of the present invention, the carbon-based particle may include pores therein. For example, the carbon-based particle may be a porous particle including a plurality of pores therein. In this case, a silicon-containing coating layer may be formed at an inside of the pores and/or on a surface of the pores. Accordingly, cracks due to a difference in volume expansion rations between carbon and silicon may be prevented during charging and discharging of a secondary battery.

In exemplary embodiments, a carbon coating layer may be formed on the silicon-containing coating layer. Thus, a contact between silicon of the anode active material and the moisture in an atmosphere or between silicon and water in an anode slurry may be prevented. Thus, a reduction of a discharge capacity and a capacity efficiency of the secondary battery for a period from a preparation of the anode active material to a formation of an anode may be prevented.

In exemplary embodiments, a full width at half maximum (FWHM) of an O1s peak measured by an X-ray photoelectron spectroscopy (XPS) of a surface of the anode active material may be 2.0 or more. In this case, a reaction of silicon and water on the surface of the anode active material may be sufficiently suppressed. Thus, the reduction of the discharge capacity and the capacity efficiency of the secondary battery may be prevented.

In exemplary embodiments, an XPS Si2p peak area ratio of the anode active material may be 15.0% or less. In this case, a ratio of $SiO_2$ formed by the reaction of silicon and water on the surface of the anode active material may be lowered. Thus, a conversion of silicon to $SiO_2$ in the anode active material may be suppressed, and thus the discharge capacity and the capacity efficiency of the secondary battery may be improved.

DETAILED DESCRIPTION OF THE EMBODIMENTS

Figure 1:
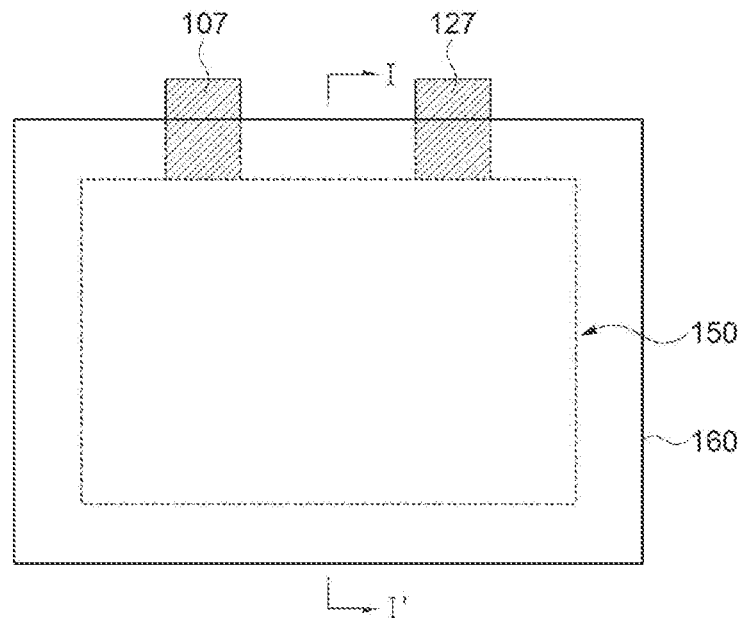
FIGS. 1 and 2 are a schematic top planar view and a schematic cross-sectional view, respectively, illustrating a lithium secondary battery in accordance with exemplary embodiments.

According to exemplary embodiments of the present invention, an anode active material for a lithium secondary battery including a carbon-based particle including pores therein, a silicon-containing coating layer formed on the carbon-based particle and a carbon coating layer formed on the silicon-containing coating layer is provided. According to exemplary embodiments of the present invention, a lithium secondary battery including the anode active material is also provided.

Hereinafter, the present invention will be described in detail with reference to embodiments provided together with experimental examples and the accompanying drawings. However, those skilled in the art will appreciate that such embodiments are provided to further understand the spirit of the present invention and do not limit subject matters to be protected as disclosed in the detailed description and appended claims.

For example, the anode active material may be formed to include silicon and carbon-based particles. In this case, carbon may partially reduce a volume expansion of silicon. However, during charging and discharging of the secondary battery, a difference between a volume expansion ratio of silicon (e.g., about 400% or more) and a volume expansion ratio of carbon (e.g., about 150% or less) may become increased to cause cracks in the anode active material. Accordingly, the anode active material may be exposed to an electrolyte during repeated charging and discharging to cause a side reaction such as a gas generation, and life-span properties of the secondary battery may be deteriorated.

In exemplary embodiments of the present invention, the carbon-based particles may include pores therein. For example, the carbon-based particle may be a porous particle including a plurality of pores.

In some embodiments, a silicon-containing coating layer may be formed at an inside of the pores and on surfaces of the carbon-based particles. Accordingly, cracks due to the difference in volume expansion ratios between carbon and silicon during the charging and discharging of the secondary battery may be prevented.

In exemplary embodiments, a pore size of the carbon-based particles may be 20 nm or less, preferably less than 10 nm. In this range, an excessive deposition of silicon in the pores may be prevented. Thus, defects due to the difference in volume expansion ratio of carbon and silicon during the charging and discharging of the secondary battery may be further alleviated.

In some embodiments, the pore size of the carbon-based particle may be in a range from 0.1 nm to 20 nm, or from 0.1 nm to 10 nm.

For example, the above-mentioned carbon-based particle may include activated carbon, a carbon nanotube, a carbon nanowire, graphene, a carbon fiber, carbon black, graphite, a porous carbon, a thermally decomposed cryogel, a thermally decomposed xerogel, a thermally decomposed aerogel, etc. These may be used alone or in a combination thereof.

In some embodiments, the above-described carbon-based particle may include an amorphous structure or a crystalline structure. Preferably, the carbon-based particle may have an amorphous structure. In this case, durability of the anode active material may be increased to suppress a crack generation by repeated charging/discharging or by an external impact. Accordingly, life-span properties of the secondary battery may be improved.

In exemplary embodiments, the anode active material may include a silicon-containing coating layer formed at an inside of the pores of the above-described carbon-based particle and/or on a surface of the carbon-based particle. A high capacity from silicon included in the silicon-containing coating layer may be employed while reducing the difference of volume expansion ratios between silicon and carbon. Thus, micro-cracks and exposure to an electrolyte due to repeated charging and discharging of the secondary battery may be reduced or avoided, so that life-span properties may be improved while maintaining a power of the secondary battery.

For example, the silicon-containing coating layer may mean a layer in which a silicon particle is formed on at least a portion of the pores and/or the surface of the carbon-based particle.

In exemplary embodiments, the above-described silicon-containing coating layer may have an amorphous structure or may contain silicon having a crystallite size measured through X-ray diffraction (XRD) analysis of 7 nm or less. In preferable embodiments, the crystallite size may be 4 nm or less. In this above range, mechanical stability of the anode active material may be improved during a pressing process for a fabrication of the secondary battery or during repeated charging/discharging. Thus, a capacity retention may be increased, and the life-span properties of the secondary battery may be enhanced.

The term "amorphous structure" used herein indicates that a shape of a single silicon included in the silicon-containing coating layer is amorphous, or a size of the single silicon is excessively small and substantially cannot be measured using a Scherrer equation represented by Equation 1 below by an X-ray diffraction (XRD) analysis $$L = \frac{0.9\lambda}{\beta \cos\theta} \quad \text{[Equation 1]}$$

In the Equation 1 above, L is the crystallite size (nm), $\lambda$ is an X-ray wavelength (nm), $\beta$ is a full width at half maximum (rad) width of a corresponding peak, and $\theta$ is a diffraction angle (rad). In exemplary embodiments, the full width at half maximum (FWHM) in the XRD analysis for measuring the crystallite size may be measured from a peak of a (111) plane of silicon included in the silicon-containing coating layer.

In some embodiments, in the Equation 1 above, $\beta$ may be a FWHM correcting a value derived from a device. In an embodiment, Si may be used as a standard material for reflecting the device-derived value. In this case, a FWHM profile of Si over an entire $2\theta$ range may be fitted, and the device-derived FWHM may be expressed as a function of $2\theta$. Thereafter, a value obtained by subtracting and correcting the FWHM value derived from the device in the corresponding $2\theta$ obtained from the above function may be used as $\beta$.

In some embodiments, the silicon-containing coating layer may further contain at least one of $SiO_x$ (0<x<2) and silicon carbide (SIC).

In some embodiments, silicon carbide (SiC) may be not formed in the pores of the carbon-based particle or on the surface of the carbon-based particle. For example, the silicon-containing coating layer may not include silicon carbide. For example, the silicon-containing coating layer may include only silicon or silicon oxide. Accordingly, the capacity properties of the lithium secondary battery may be improved.

For example, forming of silicon carbide may be suppressed by controlling a temperature and time during silicon deposition process.

In some embodiments, the above-described silicon may include an amorphous structure. In this case, the crystallite size of silicon and a peak intensity ratio of a Raman spectrum which will be described later may be maintained within an appropriate range. Accordingly, improved life-span properties may be achieved while maintaining capacity properties.

In exemplary embodiments, the peak intensity ratio of the Raman spectrum of silicon included in the silicon-containing coating layer defined by Equation 2 below may be 1.2 or less, preferably 1.0 or less.

Peak intensity ratio of Raman spectrum = $I(515)/I(480)$ [Equation 2]

In Equation 2, I(515) is a peak intensity of silicon included in the silicon-containing coating layer in a region having a wavenumber of 515 $cm^{-1}$ in the Raman spectrum, and I(480) is a peak intensity of silicon included in the silicon-containing coating layer in a region having a wavenumber of 480 $cm^{-1}$ in the Raman spectrum.

For example, I(515) in Equation 2 may represent a ratio of silicon having a crystalline structure included in the silicon-containing coating layer, and I(480) in Equation 2 may represent a ratio of silicon having an amorphous structure included in the silicon-containing coating layer.

For example, in the above range of the peak intensity ratio is satisfied, the ratio of the amorphous structure from silicon included in the silicon-containing coating layer may be increased, and thus structural stability of the anode active material may be enhanced. Accordingly, improved life-span properties of the secondary battery may be obtained.

In some embodiments, both the above-described ranges of the crystallite size and the peak intensity ratio of the Raman spectrum may be satisfied. In this case, the amorphous property of the silicon-containing coating layer may be further improved, and thus stability of the anode active material may also be improved. Accordingly, an additional synergistic effect of the life-span properties of the anode active material may be implemented.

For example, silicon included in the above-described silicon-containing coating layer may easily react with a moisture in an atmosphere or water in an anode slurry on a surface of the anode active material. For example, based on Chemical Equations 1 and 2, silicon may be irreversibly converted into a silicon compound to generate a gas.

[Chemical Equation 1]

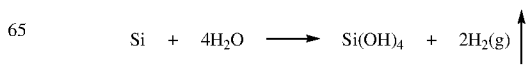

[Chemical Equation 2]

Accordingly, the discharge capacity and the capacity efficiency of the secondary battery may be reduced due to the moisture in the air or a water component of the anode slurry during a period from the preparation of the anode active material to the formation of the anode.

In exemplary embodiments of the present invention, a carbon coating layer may be formed on the silicon-containing coating layer described above. Accordingly, the contact between silicon of the anode active material and the moisture in the atmosphere or the contact between silicon and water in the anode slurry may be prevented. Thus, the reduction of the discharge capacity and the capacity efficiency of the secondary battery may be prevented for the period from the preparation of the anode active material to the formation of the anode.

For example, the carbon coating layer may mean a layer in which a carbon particle is formed on at least a portion of the silicon-containing coating layer.

In some embodiments, the carbon coating layer may include at least one of carbon and a conductive polymer. Accordingly, the formation of the carbon coating layer may be facilitated while implementing the above-described effect of preventing the contact between water and silicon. Thus, the reduction of the discharge capacity and the capacity efficiency of the secondary battery may be prevented.

For example, the conductive polymer may include polyacetylene, polyaniline, polypyrrole and/or polythiophene.

In some embodiments, the carbon coating layer may also be formed on a portion of the inside of the pores and the surface of the carbon-based particle on which the silicon-containing coating layer may not be formed. For example, the carbon coating layer may completely cover silicon and the carbon-based particle on the carbon-based particle on which the silicon-containing coating layer is formed. Accordingly, mechanical stability and chemical stability of the anode active material may be improved while blocking the contact between silicon included in the silicon-containing coating layer and water.

In exemplary embodiments, the full width at half maximum (FWHM) of an O1s peak measured through an X-ray photoelectron spectroscopy (XPS) of the surface of the above-described anode active material may be 2.0 or more, preferably 2.4 or more.

For example, the full width at half maximum of the O1s peak measured from the XPS may indicate a sigma bonding of oxygen. According to exemplary embodiments of the present invention, the full width at half maximum of the O1s peak may indicate an amount of water ($H_2O$) that may not react with silicon on the surface of the anode active material. Thus, as the full width at half maximum becomes larger, less silicon may react with water on the surface of the anode active material.

For example, if the full width at half maximum of the XPS O1s peak on the surface of the anode active material is 2.0 or more, the reaction between silicon and water on the surface of the anode active material may be sufficiently suppressed. Thus, the reduction of the discharge capacity and the capacity efficiency of the secondary battery may be prevented for the period from the preparation of the anode active material to the formation of the anode.

In some embodiments, an XPS Si2p peak area ratio defined by Equation 3 of the anode active material may be 15.0% or less.

$$XPS\ Si2p \text{ peak area ratio } (\%) = \{p1/(p1 + p2 + p3)\} * 100 \quad \text{[Equation 3]}$$

In Equation 3, p1 is a peak area of a Si—O bond of $SiO_2$ measured on the surface of the anode active material for a lithium secondary battery from the XPS, p2 is a peak area of a Si—O bond of $SiO_x$ (0<x<2) measured on the surface of the anode active material from the XPS, and p3 is a peak area of a Si—Si bond measured on the surface of the anode active material from the XPS.

For example, the XPS Si2p peak area ratio may indicate a ratio of a bonding energy strength of the Si—O bond included in $SiO_2$ relative to a total bonding energy strength of the Si—Si bond and the Si—O bond of compounds present on the surface of the anode active material. It may mean a ratio of strength.

For example, if the XPS Si2p peak area ratio is 15.0% or less, a ratio of $SiO_2$ formed by the reaction of silicon and water on the surface of the anode active material may be low. Thus, a conversion of silicon to $SiO_2$ in the anode active material may be suppressed, and the discharge capacity and the capacity efficiency of the secondary battery may be improved.

Hereinafter, a method of manufacturing the above-described anode active material for a lithium secondary battery according to exemplary embodiments is described in detail.

In exemplary embodiments, carbon-based particles including pores may be prepared.

In some embodiments, a resol oligomer may be prepared by mixing an aromatic compound containing a hydroxyl group and an aldehyde-based compound. For example, the aromatic compound including the hydroxyl group may include phenol, and the aldehyde-based compound may include formaldehyde. The resol oligomer may be cured by adding a curing agent to the resol oligomer, and the carbon-based particles may be obtained after performing classification, washing and calcination processes.

In some embodiments, an aromatic compound and a vinyl-based compound may be mixed and polymerized. Thereafter, washing and calcination may be performed to obtain the carbon-based particles including the pores. For example, the aromatic compound may include polystyrene, and the vinyl-based compound may include divinylbenzene.

In some embodiments, an activation process may be performed. In this case, an activity of a pore structure in the carbon-based particle may be easily controlled.

In an embodiment, the activation process may include a physical activation method. For example, a gas having reactivity with carbon (steam, carbon dioxide, or a mixed gas of steam, carbon dioxide and an inert gas) may be added and heat-treated at a temperature from 700° C. to 1,000° C.

In an embodiment, the activation process may include a chemical activation method. For example, acidic and basic chemicals such as KOH, $Na_2CO_3$, NaOH and $H_3PO_4$ may be used as an activator. The chemical activation method may be performed at a temperature less than that for the physical activation method.

A size of pores included in the carbon-based particles obtained by the above-described method may be 20 nm or less.

In exemplary embodiments, a silicon source may be introduced into a reactor in which the carbon-based particles are located, and then a first calcination may be performed to deposit silicon at an inside of the pores and/or on a surface of the carbon-based particle by first firing.

For example, the silicon source may include a silicon-containing gas. In an embodiment, the silicon-containing gas may be a silane gas.

In some embodiments, the first firing may be performed at less than 600° C. In the temperature range, silicon having an amorphous structure may be sufficiently included in a silicon-containing coating layer. Thus, mechanical stability of the anode active material may be improved during a pressing process or repeated charging and discharging of the secondary battery.

In exemplary embodiments, a carbon source may be introduced to a reactor in which the carbon-based particles on which silicon is deposited are located to form a carbon coating layer on a surface of silicon. A side reaction between silicon and water may be suppressed by the carbon coating layer so that a full width at half maximum of an O1s peak on a surface of an anode active material measured by an XPS may be 2.0 or more. Accordingly, the discharge capacity and the capacity efficiency of the secondary battery may be improved.

In some embodiments, the carbon source may include pitch, glucose, sucrose, a phenolic hydrocarbon and/or a resorcinol-based hydrocarbon. In this case, a second calcination may be performed after the introduction of the carbon source.

In some embodiments, the carbon source may include a methane gas, an ethylene gas, a propylene gas, an acetylene gas, etc. These may be used alone or in a combination thereof. In this case, the carbon coating layer may be formed by a chemical vapor deposition (CVD) process. For example, the CVD process may include performing a second calcination while introducing the carbon source.

In some embodiments, the carbon source may be a conductive polymer including at least one of polyacetylene, polyaniline, polypyrrole and polythiophene. In this case, the carbon coating layer may be formed by a chemical vapor deposition, an electro-polymerization or a solution process.

In an embodiment, the conductive polymer may be modified with carbon by coating the conductive polymer and then performing a second calcination.

In some embodiments, the second calcination may be performed at a temperature less than 600° C. In this case, a ratio of the amorphous structure in carbon of the carbon coating layer and silicon of the silicon-containing coating layer may be sufficiently increased. Accordingly, mechanical stability of the anode active material may be improved during the pressing process or repeated charging and discharging of the secondary battery.

Figure 2:
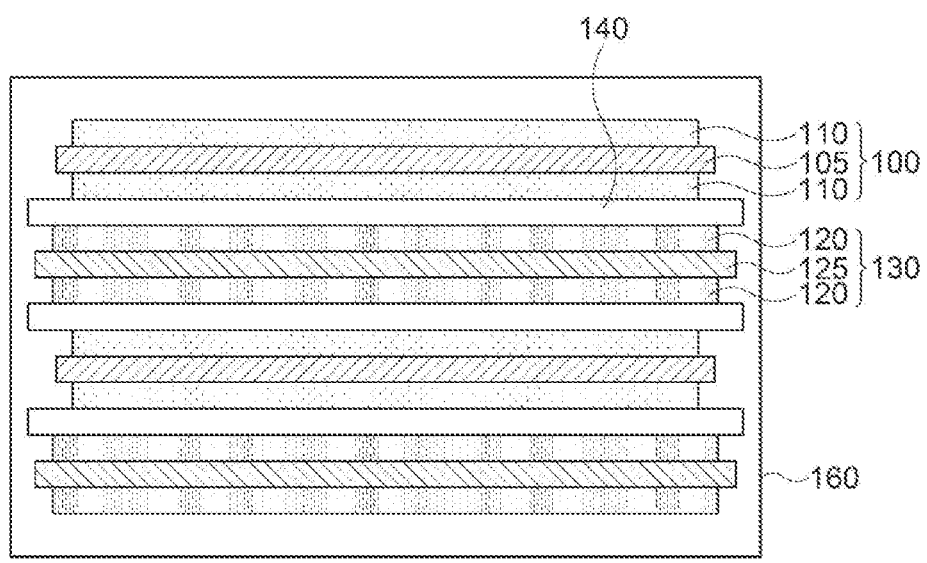

FIGS. 1 and 2 are a schematic top planar view and a schematic cross-sectional view, respectively, illustrating a lithium secondary battery in accordance with exemplary embodiments.

Referring to FIGS. 1 and 2, a lithium secondary battery may include an electrode assembly that may include a cathode 100, an anode 130 and a separation layer 140 interposed between the cathode 100 and the anode 130. The electrode assembly may be inserted in a case 160 together with an electrolyte to be immersed therein.

The cathode 100 may include a cathode active material layer 110 formed by coating a cathode active material on a cathode current collector 105.

The cathode current collector 105 may include stainless steel, nickel, aluminum, titanium, or an alloy thereof. The cathode current collector 105 may include aluminum or stainless steel that may be surface-treated with carbon, nickel, titanium, silver, etc.

The cathode active material may include a compound capable of reversibly intercalating and de-intercalating lithium ions.

In exemplary embodiments, the cathode active material may include a lithium-transition metal oxide. For example, the lithium-transition metal oxide may include nickel (Ni), and may further include at least one of cobalt (Co) and manganese (Mn).

For example, the lithium-transition metal oxide may be represented by Chemical Formula 1 below.

[Chemical Formula 1]
$$Li_xNi_{1-y}M_yO_{2+z}$$

In Chemical Formula 1, $0.9 \leq x \leq 1.2$, $0 \leq y \leq 0.7$, and $-0.1 \leq z \leq 0.1$. M may represent at least one element selected from Na, Mg, Ca, Y, Ti, Zr, Hf, V, Nb, Ta, Cr, Mo, W, Mn, Co, Fe, Cu, Ag, Zn, B, Al, Ga, Sn or Zr.

Preferably, a molar ratio of Ni (1-y) in Chemical Formula 1 may be 0.8 or more, e.g., $0.8 \leq a \leq 0.95$. In a preferable embodiment, the molar ratio of Ni may exceed 0.8.

The cathode active material may be mixed and stirred together with a binder, a conductive material and/or a dispersive agent in a solvent to form a mixture. The mixture may be coated on the cathode current collector 105, and dried and pressed to obtain the cathode 100.

A non-aqueous solvent may be used as the solvent. Non-limiting examples of the solvent may include N-methyl-2-pyrrolidone (NMP), dimethylformamide, dimethylacetamide, N,N-dimethylaminopropylamine, ethylene oxide, tetrahydrofuran, etc.

The binder may include an organic based binder such as a polyvinylidene fluoride-hexafluoropropylene copolymer (PVDF-co-HFP), polyvinylidenefluoride (PVDF), polyacrylonitrile, polymethylmethacrylate, etc., or an aqueous based binder such as styrene-butadiene rubber (SBR) that may be used with a thickener such as carboxymethyl cellulose (CMC).

Preferably, a PVDF-based binder may be used as a cathode binder. In this case, an amount of the binder for forming the cathode active material layer may be reduced, and an amount of the cathode active material may be relatively increased. Thus, capacity and power of the secondary battery may be improved.

The conductive material may be added to facilitate an electron mobility between the active material particles. For example, the conductive agent may include a carbon-based material such as graphite, carbon black, graphene, carbon nanotube, etc., and/or a metal-based material such as tin, tin oxide, titanium oxide, a perovskite material such as LaSrCoO$_3$ or LaSrMnO$_3$, etc.

In exemplary embodiments, an anode slurry may be prepared from the above-described anode active material including the carbon-based particle, the silicon-containing coating layer and the carbon coating layer. For example, the anode slurry may be prepared by mixing and stirring the anode active material in a solvent with an anode binder, a conductive material and a thickener.

For example, the solvent included in the anode slurry may be an aqueous solvent such as water, an aqueous hydrochloric acid solution, an aqueous sodium hydroxide solution, or the like.

For example, the anode binder may include a polymer material such as styrene-butadiene rubber (SBR). The thickener may include carboxylmethyl cellulose (CMC).

For example, the conductive material the same as or similar to that used from the cathode active material layer may also be used in the anode.

In some embodiments, the anode 130 may include an anode current collector 125 and an anode active material layer 120 formed by coating the anode active material on the anode current collector 125.

For example, the anode current collector 125 may include a metal that may have high conductivity and improved adhesion to the anode slurry, and may not be reactive in a voltage range of the secondary battery. For example, the anode current collector 125 may include copper, stainless steel, nickel, copper, titanium or an alloy thereof. The anode current collector 125 may include copper or stainless steel surface-treated with carbon, nickel, titanium or silver.

The separation layer 140 may be interposed between the cathode 100 and the anode 130. The separation layer 140 may include a porous polymer film prepared from, e.g., a polyolefin-based polymer such as an ethylene homopolymer, a propylene homopolymer, an ethylene/butene copolymer, an ethylene/hexene copolymer, an ethylene/methacrylate copolymer, or the like. The separation layer 140 may also be formed from a non-woven fabric including a glass fiber with a high melting point, a polyethylene terephthalate fiber, or the like.

In some embodiments, an area and/or a volume of the anode 130 (e.g., a contact area with the separation layer 140) may be greater than that of the cathode 100. Thus, lithium ions generated from the cathode 100 may be easily transferred to the anode 130 without loss by, e.g., precipitation or sedimentation. Accordingly, the improvement of capacity and power according to the above-described anode active material may be more easily implemented.

In exemplary embodiments, an electrode cell may be defined by the cathode 100, the anode 130 and the separation layer 140, and a plurality of the electrode cells may be stacked to form an electrode assembly having, e.g., a jelly roll shape. For example, the electrode assembly 150 may be formed by winding, laminating or folding of the separation layer 140.

The electrode assembly 150 may be accommodated in a case 160 together with an electrolyte to form the lithium secondary battery. In exemplary embodiments, the electrolyte may include a non-aqueous electrolyte solution.

The non-aqueous electrolyte solution may include a lithium salt and an organic solvent. The lithium salt may be represented by $Li^+X^-$, and an anion of the lithium salt $X^-$ may include, e.g., $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$; $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, $(CF_3CF_2SO_2)_2N^-$, etc.

The organic solvent may include propylene carbonate (PC), ethylene carbonate (EC), diethyl carbonate (DEC), dimethyl carbonate (DMC), ethylmethyl carbonate (EMC), methylpropyl carbonate, dipropyl carbonate, dimethyl sulfoxide, acetonitrile, dimethoxy ethane, diethoxy ethane, vinylene carbonate, sulfolane, gamma-butyrolactone, propylene sulfite, tetrahydrofuran, etc. These may be used alone or in a combination thereof.

As illustrated in FIG. 1, electrode tabs (a cathode tab and an anode tab) may protrude from the cathode current collector 105 and the anode current collector path 125 of each electrode cell to extend to a side of the case 160. The electrode tabs may be fused together with the side of the case 160 to form an electrode lead (a cathode lead 107 and an anode lead 127) extending or exposed to an outside of the case 160.

The lithium secondary battery may be fabricated into a cylindrical shape using a can, a prismatic shape, a pouch shape, a coin shape, etc.

Hereinafter, preferred embodiments are proposed to more concretely describe the present invention. However, the following examples are only given for illustrating the present invention and those skilled in the related art will obviously understand that various alterations and modifications are possible within the scope and spirit of the present invention. Such alterations and modifications are duly included in the appended claims.

EXAMPLE 1

Preparation of Carbon-Based Particle i) Synthesis of a resol oligomer: phenol and formaldehyde were mixed in a molar ratio of 1:2, and 1.5 wt % of triethylamine was added, followed by a reaction under conditions of 85° C., 4 h and 160 rpm (stirring).

ii) Suspension stabilization of the resol oligomer: 1 g of PVA was dispersed in a water-dispersible medium, and then added to the resol oligomer.

iii) Curing of the resol oligomer: 3 g of a curing agent HMTA was added, and a reaction was performed under conditions of 98° C., 12 h and 400 rpm (stirring).

iv) Obtaining a carbon material: The cured resol oligomer was classified using a sieve, and then washed with $H_2O$.

v) Unreacted monomers and oligomers were removed from the washed resol oligomer using ethanol, and then dried.

vi) Carbonization and Activation: The dried resol oligomer was calcined at 900° C. for 1 hour under a nitrogen atmosphere. During the calcination, a $CO_2$ gas was introduced at 1 L/min to perform a carbonization at 900° C.

Formation of a Silicon-Containing Coating Layer

Silane gas was injected into a CVD coater at a flow rate of 50 mL/min to 100 mL/min, and maintained at a temperature less than 600° C. at a heating rate of 5° C./min to 20° C./min for about 120 to 240 minutes to form a silicon-containing coating layer.

Formation of a Carbon Coating Layer

The silicon-deposited carbon-based particles were put into a thermal CVD chamber, a mixed gas of ethylene gas and argon was supplied, and a heat treatment was performed at a temperature less than 600° C. to prepare an anode active material having a carbon coating layer formed thereon.

Preparation of an Anode

The anode active material as prepared above was left for one day. 95.5 wt % of a mixture containing 15 wt % of the prepared anode active material and 80.5 wt % of artificial graphite, 1 wt % by weight of CNT as a conductive material, 2 wt % of styrene-butadiene rubber (SBR) as a binder, and 1.5 wt % of carboxymethyl cellulose (CMC) as a thickener were mixed to form an anode slurry.

The anode slurry was coated on a copper substrate, dried and pressed to prepare an anode.

Fabrication of a Li-Half Cell

A lithium secondary battery including the anode as prepared above and a lithium metal as a counter electrode (cathode) was fabricated.

Specifically, a separator (polyethylene, thickness: 20 μm) was interposed between the anode and the lithium metal (thickness: 1 mm). to form a lithium coin half-cell.

The lithium metal/separator/cathode assembly was placed in a coin cell plate, an electrolyte was injected, and then a cap was covered and clamped. As the electrolyte, 1M $LiPF_6$ solution in a mixed solvent of EC/FEC/EMC/DEC (20/10/20/50; volume ratio) was used. After clamping and impregnating for more than 12 hours, 3 cycles of 0.1C charging and discharging were performed (charge condition: CC-CV 0.1C 0.01V 0.01C CUT-OFF, discharge condition: CC 0.1C 1.5V CUT-OFF).

EXAMPLE 2

The silicon-deposited carbon-based particles were dispersed in a 0.1 M aqueous pyrrole solution and stirred for 6 hours, and then $NaNO_2$ was added as an initiator and stirred for 24 hours for a polymerization. Thereafter, a solid product was obtained through a filtering process, purified with distilled water, and vacuum dried at 110° C. to form a carbon coating layer containing polypyrrole.

An anode and a lithium half-cell including the anode were fabricated by the method the same as that in Example 1, except that the carbon coating layer was formed as described above.

EXAMPLE 3

The silicon-deposited carbon-based particles were added to a solution in which pitch was dispersed in a tetrahydrofuran solvent, and then dispersed by an ultrasonic dispersion for 30 minutes and stirred for 24 hours. The solution was dried in an oven for 24 hours, and then calcined at a temperature less than 600° C. to form a carbon coating layer.

An anode and a lithium half-cell including the anode were fabricated by the method the same as that in Example 1, except that the carbon coating layer was formed as described above.

EXAMPLES 4 and 5

An anode and a lithium half-cell including the anode were fabricated by the method the same as that in Example 1, except that an anode active material having an FWHM of an O1s peak and an XPS Si2p peak area ratio as shown in Table 2 was prepared by adjusting a calcination temperature in a range from 600° C. to 650° C. when forming the carbon coating layer.

EXAMPLES 6 and 7

An anode and a lithium half-cell including the anode were fabricated by the method the same as that in Example 1, except that a silane gas was injected into the CVD coater at a flow rate of 100 mL/min to 500 mL/min and maintained at 600° C. or higher at a heating rate of 5° C./min to 20° C./min for about 30 to 120 minutes to form a silicon-containing coating layer.

The silicon-containing coating layers included in the anode active materials according to Examples 6 and 7 were formed by changing the flow rate of the silane gas, the heating rate, the temperature and the time.

COMPARATIVE EXAMPLE 1

An anode and a lithium half-cell including the anode were fabricated by the method the same as that in Example 1, except that a carbon coating layer was not formed during the preparation of the anode active material.

COMPARATIVE EXAMPLE 2

An anode and a lithium half-cell including the anode were fabricated by the method the same as that in Example 2, except that a carbon coating layer was not formed during the preparation of the anode active material.

COMPARATIVE EXAMPLE 3

An anode and a lithium half-cell including the anode were fabricated by the method the same as that in Example 3, except that a carbon coating layer was not formed during the preparation of the anode active material.

EXPERIMENTAL EXAMPLE (1) Measurement of FWHM of O1s Peak by X-ray Photoelectron Spectroscopy (XPS)

O1s peaks on surfaces of the anode active materials according to the above-described Examples and Comparative Examples were measured using an XPS. FWHMs were calculated by fitting the measured O1s peaks.

The XPS was performed using an Al K-alpha beam, a voltage was set to 1486.68 eV, and a beam size was set to 650 μm. An analysis of the measured XPS results was performed in a CAE (constant analyzer energy) mode.

(2) Measurement of XPS Si2p Peak Area Ratio

After measuring the XPS for the anode active materials according to the above-described Examples and Comparative Examples, deconvolution of the Si2p spectrum was performed, and p1 to p3 of Equation 3 were measured by calculating a peak area at 103.3 eV as an area of $SiO_2$, a peak area at 101.8 eV as an area of SiOx (0<x<2), and a peak area of 99.3 eV as an area of Si. The XPS Si2p peak area ratio was obtained using Equation 3.

(3) Measurement of Peak Intensity Ratio of Raman Spectrum

A Raman spectrum of silicon included in the silicon-containing coating layer was measured using a 532 nm laser Raman spectroscopy for the anode active materials according to the above-described Examples and Comparative Examples. In the obtained Raman spectrum, a silicon peak intensity in a region having a wavenumber of 515 $cm^{-1}$ and a silicon peak intensity in a region having a wavenumber of 480 $cm^{-1}$ were measured. The measured peak intensities were applied to Equation 2 to calculate the peak intensity ratio of the Raman spectrum.

(4) Measurement of Amorphous Property and Crystallite Size of Silicon

Crystallite sizes of the anode active materials according to the above-described Examples and Comparative Examples were calculated using an XRD analysis and Equation 1 as described above.

If a silicon particle size was excessively small and was not substantially measured through the XRD analysis, the anode active material was determined as amorphous.

Specific XRD analysis equipment/conditions are as shown in Table 1 below.

TABLE 1

| XRD(X-Ray Diffractometer) EMPYREAN | |
|---|---|
| Maker | PANalytical |
| Anode material | Cu |

TABLE 1-continued

| XRD(X-Ray Diffractometer) EMPYREAN | |
|---|---|
| K-Alpha1 wavelength | 1.540598 Å |
| Generator voltage | 45 kV |
| Tube current | 40 mA |
| Scan Range | 10–120° |
| Scan Step Size | 0.0065° |
| Divergence slit | ¼° |
| Antiscatter slit | ½° |

(5) Measurement of Initial Discharge Capacity

One cycle of charging (CC-CV 0.1C 0.01V 0.05C CUT-OFF) and discharging (CC 0.1C 1.5V CUT-OFF) was performed at room temperature (25° C.) for each lithium half-cell according to the above-described Examples and Comparative Examples, and then an initial discharge capacity was measured.

(6) Measurement of Initial Capacity Efficiency 10 cycles of charging (CC-CV 0.1C 0.01V 0.05C CUT-OFF) and discharging (CC 0.1C 1.0V CUT-OFF) were performed at room temperature (25° C.) for each lithium half-cell according to the above-described Examples and Comparative Examples, and then a discharge capacity was measured.

An initial capacity efficiency was calculated as a percentage of the discharge capacity at the 10th cycle relative to the initial discharge capacity.

The results are shown in Table 2 below.

TABLE 2

| No. | carbon coating layer | | silicon-containing coating layer | | initial discharge capacity (mAh/g) | initial capacity efficiency (%) |
|---|---|---|---|---|---|---|
| | FWHM of XPS O1s peak | XPS Si2p peak area ratio (%) | crystallite size (nm) | peak intensity ratio | | |
| Example 1 | 2.48 | 0 | amorphous | 0.581 | 1813 | 92.1 |
| Example 2 | 2.33 | 0 | 4 | 0.897 | 1414 | 91.5 |
| Example 3 | 2.46 | 0 | amorphous | 0.903 | 1903 | 90.8 |
| Example 4 | 2.17 | 14.2 | amorphous | 0.771 | 1820 | 91.8 |
| Example 5 | 2.04 | 15.7 | 5 | 1.053 | 1753 | 90.2 |
| Example 6 | 2.49 | 0 | 7.5 | 1.181 | 1792 | 88.1 |
| Example 7 | 2.47 | 0 | 6.91 | 1.21 | 1805 | 88.2 |
| Comparative Example 1 | 1.69 | 54 | 4 | 0.595 | 1650 | 86.9 |
| Comparative Example 2 | 1.53 | 72 | 4 | 0.912 | 1285 | 86.3 |
| Comparative Example 3 | 1.67 | 62 | amorphous | 0.920 | 1636 | 84.6 |

Referring to Table 2, in Comparative Examples where the carbon coating layer was not formed on silicon or the FWHM of the XPS O1s peak was less than 2.0, the initial discharge capacity and initial efficiency were remarkably lowered as compared to those from Examples.

When comparing Examples 1, 4 and 5 in which raw materials of the carbon coating layer are the same, Examples 1 and 4 provided improved initial discharge capacity and initial efficiency relatively to those from Example 5 where the XPS Si2p peak area ratio exceeded 15.0%.

When comparing Example 1 where the crystallite size of silicon included in the silicon-containing coating layer was 7 nm or less and the peak intensity ratio of the Raman spectrum was 1.2 or less with Examples 6 and 7, Example 1 provided improved capacity efficiency relatively to Example 6 where the crystallite size of silicon exceeded 7 nm and Example 7 where the peak intensity ratio of the Raman spectrum exceeded 1.2.

When comparing Examples 1, 3 and 2, Examples 1 and 3 provided improved initial discharge capacity and initial efficiency relatively to those from Example 2 where the FWHM of the XPS O1s peak was less than 2.4.

What is claimed is:

1. An anode active material for a lithium secondary battery, comprising:
   a carbon-based particle including pores therein;
   a silicon-containing coating layer formed inside the pores of the carbon-based particle or on a surface of the carbon-based particle; and
   a carbon coating layer formed on the silicon-containing coating layer, the carbon coating layer comprising a conductive polymer.

2. The anode active material for a lithium secondary battery of claim 1, a full width at half maximum (FWHM) of an O1s peak of a surface of the anode active material measured by an X-ray photoelectron spectroscopy (XPS) is 2.0 or more.

3. The anode active material for a lithium secondary battery of claim 2, wherein the FWHM of the O1s peak of the surface measured by the XPS is 2.4 or more.

4. The anode active material for a lithium secondary battery of claim 1, wherein an XPS Si2p peak area ratio defined by Equation 3 is 15.0% or less:

$$XPS\ Si2p\ \text{peak area ratio (\%)} = \{p1/(p1 + p2 + p3)\} * 100 \quad \text{[Equation 3]}$$

wherein, in Equation 3, p1 is a peak area of a Si—O bond of $SiO_2$ measured on the surface of the anode active material from the XPS, p2 is a peak area of a Si—O bond of $SiO_x$, 0<x<2, measured on the surface of the anode active material from the XPS, and p3 is a peak area of a Si—Si bond measured on the surface of the anode active material from the XPS.

5. The anode active material for a lithium secondary battery of claim 1, wherein the carbon-based particle comprises at least one selected from the group consisting of activated carbon, a carbon nanotube, a carbon nanowire, graphene, a carbon fiber, carbon black, graphite, a porous carbon, a thermally decomposed cryogel, a thermally decomposed xerogel, and a thermally decomposed aerogel.

6. The anode active material for a lithium secondary battery of claim 1, wherein the carbon-based particle has an amorphous structure.

7. The anode active material for a lithium secondary battery of claim 1, wherein silicon included in the silicon-containing coating layer has an amorphous structure or a crystallite size measured through an X-ray diffraction (XRD) analysis of 7 nm or less.

8. The anode active material for a lithium secondary battery of claim 6, wherein the crystallite size of silicon included in the silicon-containing coating layer is measured by Equation 1 below:

$$L = 0.9\lambda/\beta\cos\theta \quad \text{[Equation 1]}$$

wherein, in Equation 1, L is the crystallite size (nm), $\lambda$ is an X-ray wavelength (nm), $\beta$ is a full width at half maximum (rad) of a (111) plane of silicon included in the silicon-containing coating layer, and $\theta$ is a diffraction angle (rad).

9. The anode active material for a lithium secondary battery of claim 1, wherein silicon included in the silicon-containing coating layer has a peak intensity ratio of 1.2 or less in a Raman spectrum defined by Equation 2 below:

$$\text{Peak intensity ratio of Raman spectrum} = I(515)/I(480) \quad \text{[Equation 2]}$$

wherein, in Equation 2, I(515) is a peak intensity of silicon included in the silicon-containing coating layer in a region having a wavenumber of 515 cm$^{-1}$ in the Raman spectrum, and I(480) is a peak intensity of silicon included in the silicon-containing coating layer in a region having a wavenumber of 480 cm$^{-1}$ in the Raman spectrum.

10. The anode active material for a lithium secondary battery of claim 1, wherein the silicon-containing coating layer further contains at least one of SiO$_x$, 0<x<2, and silicon carbide (SiC).

11. The anode active material for a lithium secondary battery of claim 1, wherein the silicon-containing coating layer does not include silicon carbide (SiC).

12. The anode active material for a lithium secondary battery of claim 1, wherein the carbon coating layer is also formed on a portion where the silicon-containing coating layer is not formed among the inside of the pores and the surface of the carbon-based particle.

13. A lithium secondary battery, comprising:
an anode comprising the anode active material layer for a lithium secondary battery of claim 1; and
a cathode facing the anode.

* * * * *